(12) United States Patent
Katsuma et al.

(10) Patent No.: US 7,052,147 B2
(45) Date of Patent: May 30, 2006

(54) LIGHT SOURCE, AND PROJECTOR PROVIDED WITH THE LIGHT SOURCE

(75) Inventors: Ryoji Katsuma, Suwa (JP); Motoyuki Fujimori, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 19 days.

(21) Appl. No.: 10/779,666

(22) Filed: Feb. 18, 2004

(65) Prior Publication Data

US 2004/0233399 A1    Nov. 25, 2004

(30) Foreign Application Priority Data

Feb. 20, 2003  (JP)  ............................. 2003-042666

(51) Int. Cl.
  G03B 21/14   (2006.01)
  G03B 21/22   (2006.01)
  G03B 21/20   (2006.01)
  G03B 21/28   (2006.01)
  B60Q 3/04    (2006.01)

(52) U.S. Cl. .................... 353/119; 353/85; 353/98; 362/362

(58) Field of Classification Search .............. 353/85, 353/87, 98, 119; 362/226, 362; 439/226, 439/911

See application file for complete search history.

(56) References Cited

U.S. PATENT DOCUMENTS 6,345,896 B1 *  2/2002  Kurosawa .................... 353/119
6,523,960 B1 *  2/2003  Watanabe ..................... 353/98

FOREIGN PATENT DOCUMENTS

| EP | 1 003 202 A2 | 5/2000 |
|----|----|----|
| JP | A-10-177151 | 6/1998 |
| JP | A-10-223023 | 8/1998 |
| JP | A-10-254061 | 9/1998 |
| JP | A-2000-200511 | 7/2000 |
| JP | A-2001-125195 | 5/2001 |
| JP | A-2001-256819 | 9/2001 |
| JP | A-2002-150831 | 5/2002 |
| JP | A-2002-202562 | 7/2002 |
| JP | A-2002-216536 | 8/2002 |
| JP | A-2002-352604 | 12/2002 |

* cited by examiner

Primary Examiner—Melissa Jan Koval
(74) Attorney, Agent, or Firm—Oliff & Berridge, PLC

(57) ABSTRACT

The invention provides a light source and a projector with sufficiently high luminance and size reduction for related art lamps, an increased lamp lifetime, and reduced noises from a cooling fan. A light source includes a concave mirror which has a reflecting part that reflects light, non-reflecting parts adjacent to this reflecting part, and permeable ports that pass through the non-reflecting parts, and which opens forward; a lamp which is arranged in this concave mirror and emits the light; and a light permeable member which covers the opening part of the concave mirror. The concave mirror includes a mesh arranged in a position where it covers the permeable port, and a protective wall to protect the mesh, which is arranged in a position where direct collision between the mesh and broken pieces of the lamp made by a burst of the lamp is reduced or prevented.

33 Claims, 11 Drawing Sheets

Fig. 4
(a)
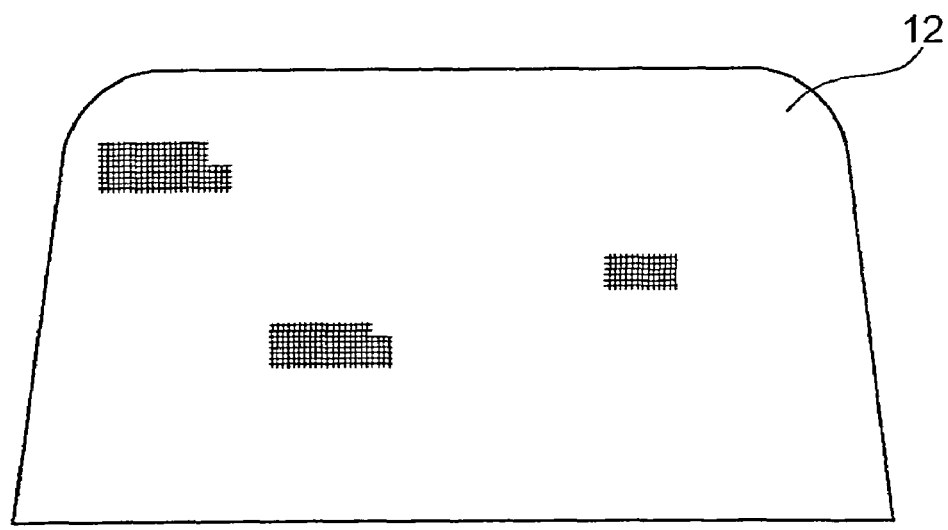
(b)
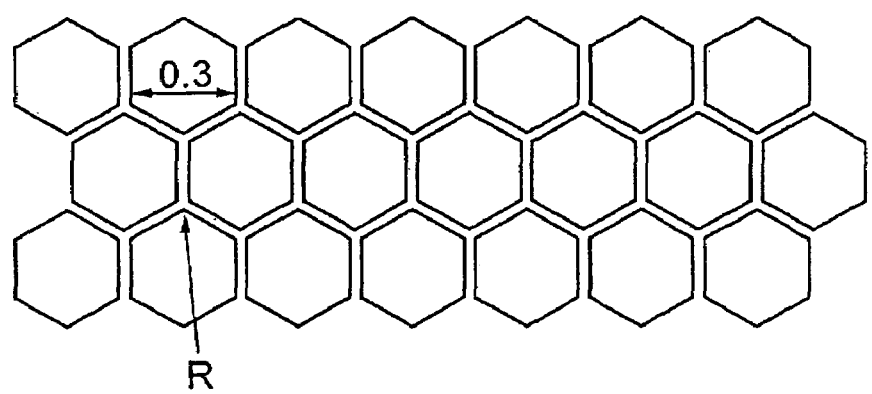

Fig. 8
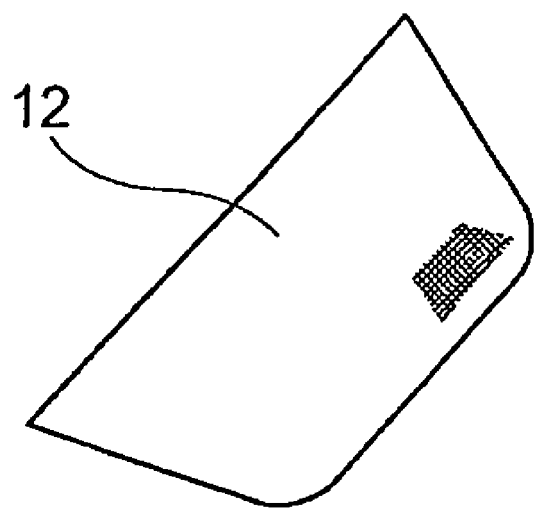
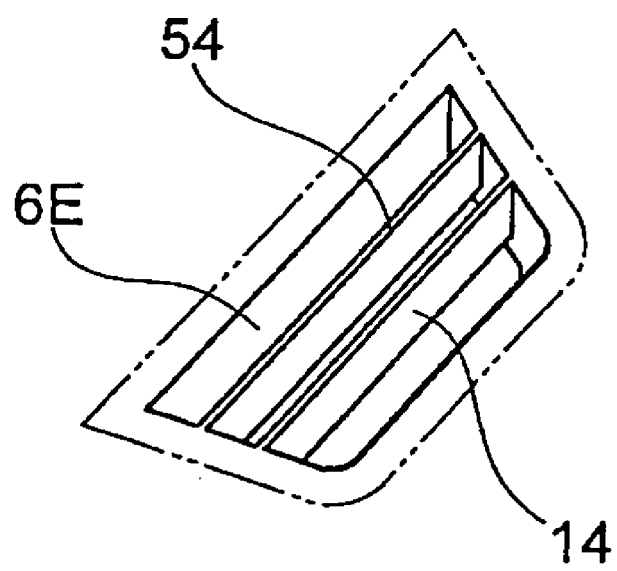

LIGHT SOURCE, AND PROJECTOR PROVIDED WITH THE LIGHT SOURCE

BACKGROUND OF THE INVENTION

1. Field of Invention

The present invention relates to a light source having a lamp, such as a high-pressure mercury lamp or a metal halide lamp, and a projector provided with this light source.

2. Description of Related Art

A related art projector includes an illuminating optical system having a light source which emits an illumination light, an electro-optic modulator which modulates the illumination light from this illuminating optical system according to image signals, and a projecting optical system which projects and displays the light modulated by this electro-optic modulator as a display image on a screen.

For such a projector, it is required that the projected image (display image) be light, the luminous intensity of the illumination light be high, and the color balance be good.

Therefore, in order to obtain a higher luminous intensity, a related art illuminating optical system is often provided with a light source having a high-pressure mercury lamp combined with a concave mirror (reflector).

Instead, in order to obtain better color balance, there is the other related art illuminating optical system provided with a light source having a metal halide lamp.

In the light source of these kinds of illuminating optical systems, a luminous tube (vitreous silica tube) of the lamp may burst due to the increase of vapor pressure during lighting. Therefore, the lamp is arranged in a sealed space (reflector in which an opening part is covered with a transparent glass plate) to prevent scattering of the broken pieces of the lamp to the outside caused by a burst of the luminous tube.

However, in such a structure (sealed structure), heat generation of the lamp makes the temperature inside the sealed space high. As a result, the lamp enters the excessively heated state, which shortens the life of the lamp.

Therefore, in order to reduce or prevent the scattering of the broken pieces of the lamp to the outside, and to lengthen the life of the lamp, a light source is disclosed in JP-A-10-254061, in which a permeable port is provided in a defined wall (reflector etc.) in which the lamp is housed, and a mesh covering this permeable port is attached.

SUMMARY OF THE INVENTION

However, related art light sources use a mesh having a comparatively low opening rate (opening rate: 58% or less). Therefore, good cooling effect and ventilation efficiency cannot be obtained. As a result, heat density of the lamp becomes high, so that there has been a problem that sufficiently high luminance and size reduction for related art lamps cannot be met, and that a long lamp lifetime cannot be realized.

Further, though a mesh having a comparatively high opening rate can be used, the strength of the mesh lowers in this case. Therefore, there is a problem that the mesh is broken off by collision with scattered glass pieces when the lamp has burst. Therefore, a mesh having a comparatively high opening rate cannot be used.

On the other hand, by increasing the blowing amount to the lamp by a cooling fan, the cooling effect and the ventilation efficiency are heightened, sufficiently high luminance and size reduction for related art lamps are met, and a long lamp life is realized. However, in this case, the number of revolutions of the cooling fan increases, so that there is a problem that noises made when the fan is on become high.

The invention addresses or solves the above and/or other problems, and provides a light source and a projector provided with this light source, in which sufficiently high luminance and size reduction for related art lamps can be met, a long lamp lifetime can be realized, and the noises from the cooling fan can be reduced.

A light source according to the invention includes a concave mirror which has a reflecting part that reflects the light, a non-reflecting part adjoining to the reflecting part, and a permeable port passing through the non-reflecting part, and which opens forward; a lamp which is arranged in the concave mirror and emits the light; and a light permeable member which is arranged forward of the lamp and covers the opening part of the concave mirror. The concave mirror includes a mesh that covers the permeable port; and a protective wall to protect the mesh, which is arranged in a position to prevent direct collision between the mesh and broken pieces of the lamp resulting from the lamp bursting.

According to the light source of the invention, even in case that the broken pieces of the lamp scatter toward the mesh due to the lamp bursting, the protective wall receives these broken pieces of the lamp, so that direct collision of the broken pieces of the lamp with the mesh is avoided.

Accordingly, the mesh having a comparatively high opening rate can be used, so that a good cooling effect and ventilation efficiency can be obtained in the concave mirror.

The heat density of the lamp can be made low, sufficiently high luminance and size reduction for related art lamps can be met, and a longer lamp lifetime can be realized.

Further, by achieving a good cooling effect and ventilation efficiency, it does not become necessary to increase the blowing amount to the lamp by the cooling fan, so that the number of revolutions of the cooling fan can be reduced, and the noise made by the cooling fan can also be reduced.

In the light source of the invention, it is preferable that the protective wall is arranged, in the permeable port, in a portion where the mesh and an extension line of an imaginary line connecting a center part of the lamp and an opening edge near the lamp of the permeable port intersect, or on the opening edge side near the lamp of the above portion.

By this constitution, even if the broken pieces of the lamp scatter along the imaginary line connecting the center of the lamp and the opening edge near the lamp of the permeable port, these broken pieces of the lamp are received by a back surface of the protective wall, so that collision of the broken pieces of the lamp with the mesh is prevented.

Further, in the light source of the invention, it is preferable that the protective wall is arranged in a position where the direct collision between the mesh and the lamp broken pieces that have bounced by the collision with the light permeable member is prevented.

By this constitution, even if the lamp broken pieces are bounced by the collision with the light permeable member due to the burst of the lamp, these broken pieces of the lamp are received by the protective wall, so that direct collision of the broken pieces of the lamp with the mesh is prevented.

Further, it is preferable that the protective wall is arranged, in the permeable port, in a portion where the mesh and a third imaginary line that is line-symmetrical about a second imaginary line connecting the center part of the lamp and a position, on the back surface of the light permeable member, which is distant from the mesh surface by a half length of a total length of the protective wall intersect; or on the light permeable member side of the above portion. Here, "line" of line-symmetry means "an imaginary line on the same plane as the second imaginary line and the third imaginary line, which is a normal line passing an intersection point, on the back surface of the light permeable member, of the second imaginary line and the third imaginary line".

By this constitution, even if the broken pieces of the lamp scatter along the second imaginary line connecting the center part of the lamp and the position, on the back surface of the light permeable member, which is distant from the mesh surface by the half length of the total length of the protective wall, collide with the light permeable member, and bound along the third imaginary line, these broken pieces of the lamp are received by a front surface of the protective wall, so that collision of the broken pieces of the lamp with the mesh is prevented.

Further, in the light source of the invention, it is preferable that the concave mirror further has an auxiliary protective wall to protect the mesh.

By this constitution, the auxiliary protective wall receives the broken pieces of the lamp that scatter by the bursting of the lamp, to thereby protect the mesh more effectively.

Further, it is preferable that the auxiliary protective wall is arranged in a position where direct collision between the mesh and the broken pieces of the lamp that scatter by the bursting of the lamp is prevented.

By this constitution, even if the broken pieces of the lamp scatter toward the mesh by the bursting of the lamp, the auxiliary protective wall receives these broken pieces of the lamp, whereby direct collision of the broken pieces of the lamp with the mesh is prevented.

Further, it is preferable that the auxiliary protective wall is arranged, in the permeable port, in a portion where the mesh and an extension line of a fourth imaginary line connecting the center part of the lamp and a leading end of the protective wall intersect, or on the protective wall side of the above portion.

By this constitution, even if the broken pieces of the lamp scatter along the fourth imaginary line connecting the center of the lamp and the leading end of the protective wall, these broken pieces of the lamp are received by a back surface of the auxiliary protective wall, so that collision of the broken pieces of the lamp with the mesh is prevented.

Furthermore, it is preferable that the auxiliary protective wall include the plural auxiliary protective walls arranged in parallel on the light permeable member side of the protective wall; and the auxiliary protective wall on the light permeable member side is arranged in a portion where the mesh and an extension line of a fifth imaginary line connecting the center part of the lamp and a leading end of the auxiliary protective wall on the protective wall side intersect, or on the protective wall side of the above portion.

By this constitution, even if the broken pieces of the lamp scatter along the fifth imaginary line connecting the center of the lamp and the leading end of the auxiliary protective wall near the protective wall, these broken pieces of the lamp are received by a back surface of the auxiliary protective wall near the light permeable member, so that collision of the broken pieces of the lamp with the mesh is prevented.

Further, it is preferable that the height dimension of the protective wall and the height dimension of the auxiliary protective wall are set to a height dimension by which an emergent ray from the lamp is not intercepted.

By this constitution, even if the protective wall or the auxiliary protective wall is provided in order to prevent the breaking of the mesh, the protective wall or the auxiliary protective wall does not intercept the emergent rays, so that a negative influence on display quality can be reduced or eliminated.

In the light source of the invention, it is preferable that the auxiliary protective wall is arranged in a position where direct collision between the mesh and the lamp broken pieces that have bounced by the collision with the light permeable member is prevented.

By this constitution, even if the lamp broken pieces are bounced by the collision with the light permeable member due to the bursting of the lamp, these broken pieces of the lamp are received by the auxiliary protective wall, so that the direct collision of the broken pieces of the lamp with the mesh is prevented.

Further, in the light source of the invention, it is preferable that the auxiliary protective wall is arranged, in the permeable port, in a portion where the mesh and a seventh imaginary line that is line-symmetrical about a sixth imaginary line connecting the center part of the lamp and a position, on the back surface of the light permeable member, which is distant from the mesh surface by a half length of a total length of the auxiliary protective wall that is closest to the light permeable member intersect; or on the light permeable member side of the above portion. Here, "line" of line-symmetry means "an imaginary line on the same plane as the sixth imaginary line and the seventh imaginary line, which is a normal line passing an intersection point, on the back surface of the light permeable member, of the sixth imaginary line and the seventh imaginary line".

By this constitution, even in case that the broken pieces of the lamp scatter along the sixth imaginary line connecting the center part of the lamp and the position, on the back surface of the light permeable member, which is distant from the mesh surface by the half length of the total length of the auxiliary protective wall that is closest to the light permeable member, collide with the light permeable member, and travel along the seventh imaginary line, these broken pieces of the lamp are received by the front surface of the auxiliary protective wall, so that collision of the broken pieces of the lamp with the mesh is prevented.

In the light source of the invention, it is preferable that the protective wall is formed of a rectifying wall which inclines in relation to the back surface of the light permeable member.

By this constitution, airflow is guided into the concave mirror along the protective wall. Cool wind flowing from the outside of the concave mirror through the permeable port into the concave mirror can thereby be rectified.

In the light source of the invention, it is preferable that the protective wall is provided integrally for the concave mirror.

By this constitution, formation of the protective wall and/or the auxiliary protective wall and formation of the concave mirror are simultaneously performed. Compared with a case in which the protective wall and/or the auxiliary protective wall is manufactured separately from the concave mirror, a manufacturing cost can thereby be reduced.

In the light source of the invention, it is preferable that the protective wall and/or the auxiliary protective wall are/is provided for the concave mirror via an attachment spacer.

By this constitution, attachment of the protective wall and/or the auxiliary protective wall to the concave mirror is performed via the attachment spacer. It becomes easy to incline the protective wall and/or the auxiliary protective wall in relation to the back surface of the light permeable member, so that a rectifying function can be given to the protective wall and/or the auxiliary protective wall. Further, in order to attach the protective wall and/or the auxiliary protective wall to the concave mirror, it is not necessary to newly form an attachment part, etc., onto the concave mirror, so that the manufacturing cost can be reduced.

In the light source of the invention, it is preferable that the opening rate cc of the mesh is set to a value satisfying $70\% \leq \alpha \leq 90\%$.

By this constitution, a good cooling effect and ventilation efficiency in the concave mirror can be surely obtained. In this case, when the opening rate α of the mesh is 70% or more, the desired cooling effect and ventilation efficiency can be obtained. On the other hand, when the opening rate α of the mesh is 90% or less, mechanical strength of the mesh does not greatly decrease.

In the light source of the invention, it is preferable that the mesh is formed of an etching mesh or a cross mesh.

By this constitution, in case that the mesh is the etching mesh, the manufacturing process is easy; and in case that the mesh is the cross mesh, a wire rod is metallized and optimization between the wire diameter and the opening rate is attempted, whereby the cross mesh can be sufficiently put to practical use.

In the light source of the invention, it is preferable that the permeable ports are arranged at least on both sides of the concave mirror.

By this constitution, airflow from the permeable port on one side of the concave mirror toward the permeable port on the other side is provided.

The light source of the invention is suitable to be used as a light source of a projector having an electro-optic modulator which modulates the light according to image signals, and a projecting optical system which projects and displays the light modulated by the electro-optic modulator.

In case that the light source of the invention is used as the light source of this projector, further increase of luminance of the projector is made possible. Further, the number of revolutions of the cooling fan can be reduced, so that the noise of the cooling fan can be reduced.

BRIEF DESCRIPTION OF THE DRAWINGS

FIGS. 4(*a*) and 4(*b*) are plan views showing the entire mesh and a part of the mesh;

FIG. 8 is a sectional view showing a fourth exemplary embodiment;

DETAILED DESCRIPTION OF PREFERRED EMBODIMENTS

A. EXEMPLARY EMBODIMENTS OF LIGHT SOURCE

A-1. Exemplary Embodiment 1

Figure 1:
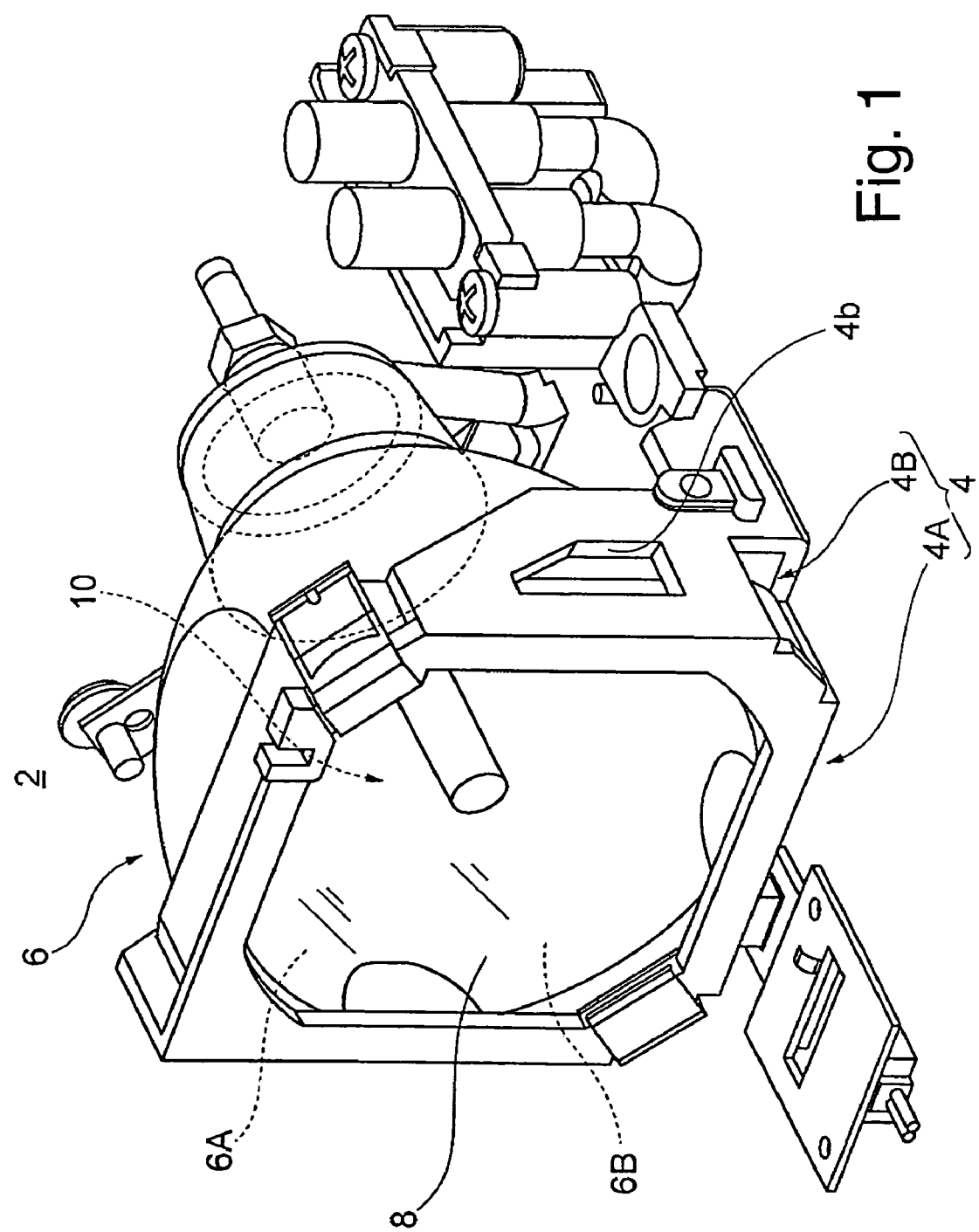
FIG. 1 is a perspective view showing the entire light source according to a first exemplary embodiment.
Figure 2:
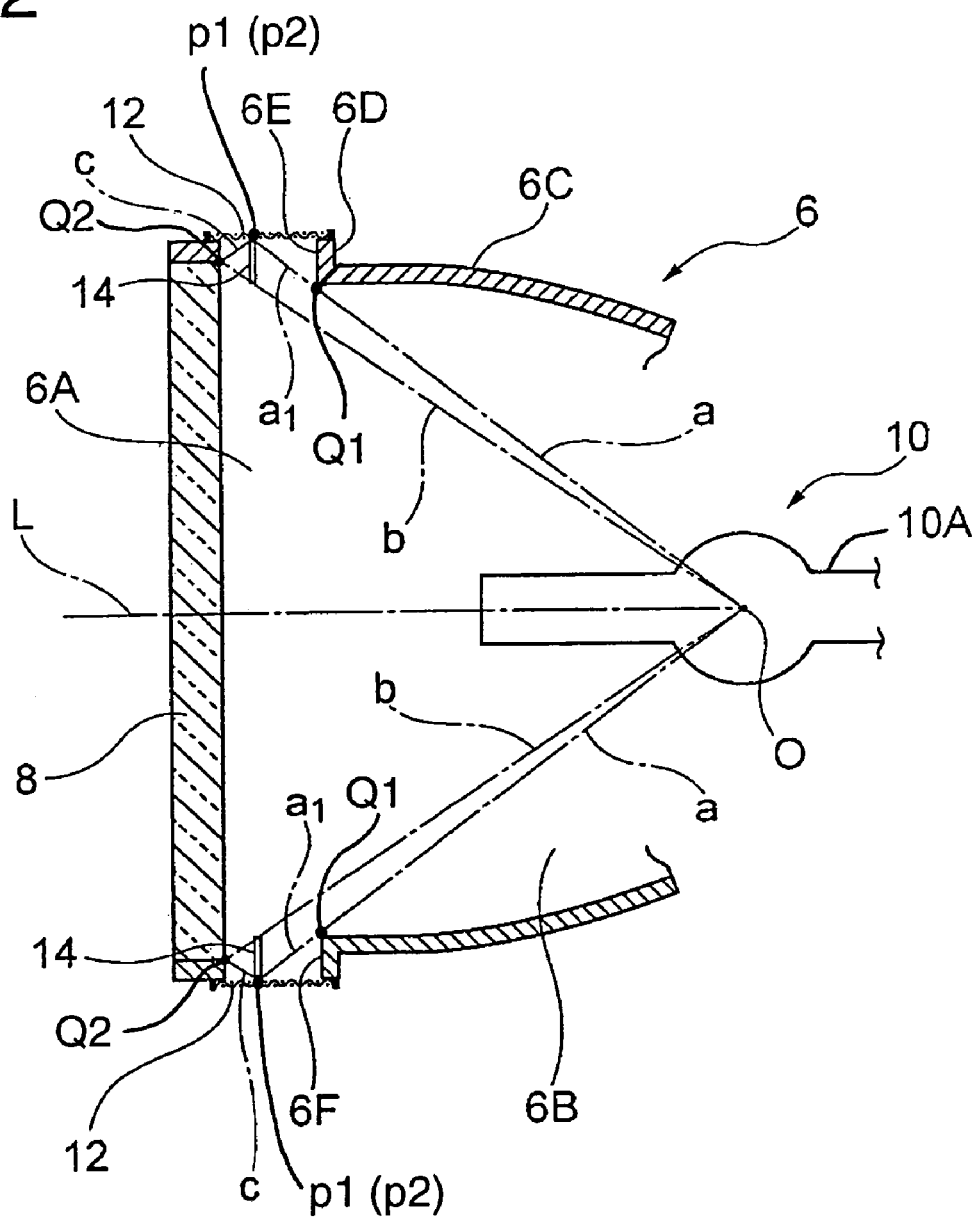
FIG. 2 is a sectional view showing a significant portion of the light source according to the exemplary embodiment.
Figure 3:
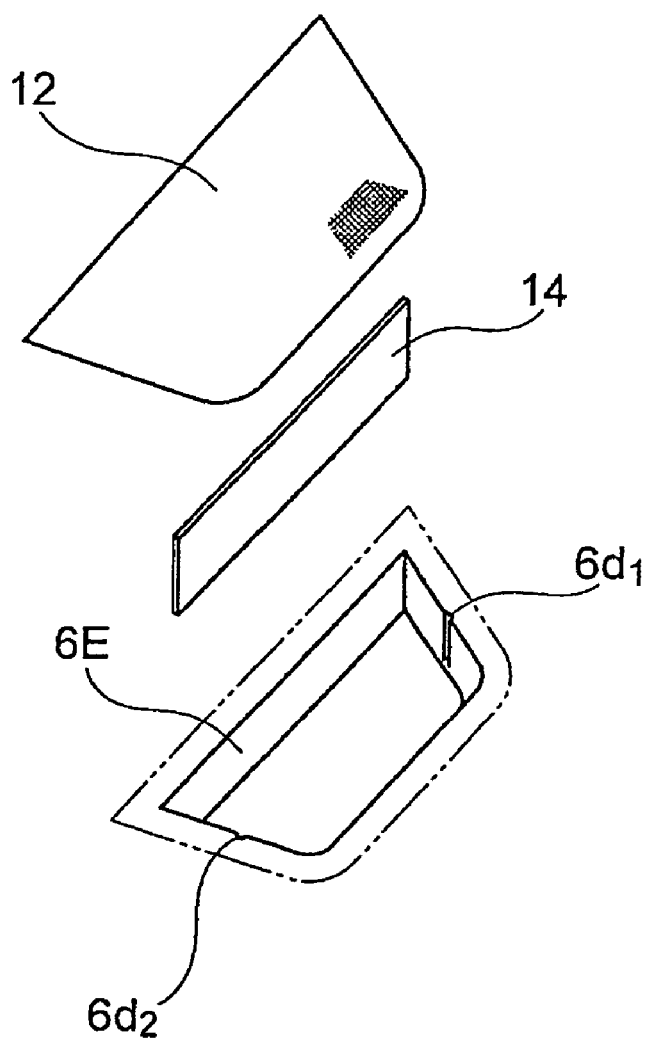
FIG. 3 is an exploded perspective view showing an attachment state of a protective wall in the light source according to the first exemplary embodiment.

FIG. 1 is a perspective view showing the entire light source according to a first exemplary embodiment of the invention. FIG. 2 is a sectional view showing a significant portion of the light source according to the first exemplary embodiment. FIG. 3 is an exploded perspective view showing an attachment state of a protective wall in the light source according to the first exemplary embodiment.

FIGS. 4(*a*) and 4(*b*) are enlarged plan views showing the entire mesh and a part of the mesh in the light source according to the first exemplary embodiment.

As shown in FIG. 1, a light source 2 is roughly composed of a lamp housing 4, a concave mirror 6, a light permeable member 8, and a lamp 10.

The lamp housing 4 includes a frame part 4A which opens in the front and back directions, and sidewall parts 4B connected to this frame part 4A, and the entire housing 4 is formed of a high heat-resistant member having a substantial C-shaped section. On both sidewall parts 4B of the lamp housing 4, through-windows 4b (only one is shown) corresponding to permeable ports (described below) of the concave mirror 6 are provided.

The lamp 10, as shown in FIG. 2, is composed of a high pressure mercury lamp having a luminous tube 10A made of vitreous silica, and housed in the concave mirror 6. Inside the luminous tube 10A, a pair of electrodes (not shown) are provided along an imaginary central axial line (lamp optical axis) L of a reflecting part 6C. When discharge is performed between these electrodes, a luminous part is formed between these electrodes, and light is emitting from the lamp 10. As the lamp 10, a metal halide lamp, a xenon lamp, or another lamp may be used.

The light emitted from the lamp 10 is reflected at the reflecting part 6C of the concave mirror 6, and this reflected light exits through the light permeable member 8.

The concave mirror 6, as shown in FIG. 1, is attached into the lamp housing 4. Further, as shown in FIG. 2, forward of the concave mirror 6 (in the light emitting direction), an opening part 6A is provided. Further, the concave mirror 6 has a space part 6B communicating with this opening part 6A.

The opening part 6A of the concave mirror 6 is closed by the light permeable member 8. The light permeable member 8 is formed of a high heat-resistant member that is hard.

For the concave mirror 6, the reflecting part 6C having a radial section is provided. The reflecting part 6C is constituted so as to reflect the light emitted from the lamp 10 and emit the reflected light nearly in parallel to the imaginary axial line (lamp optical axis) L of the reflecting part 6C. Further, for the concave mirror 6, a non-reflecting part 6D connecting to the reflecting part 6C is provided. In the vicinity of the opening part 6A of the concave mirror 6, permeable ports 6E, 6F passing through the non-reflecting parts 6D are provided. The permeable ports 6E, 6F are arranged, nearly opposed to each other with the lamp optical axis L between. In a space part 6B of the concave mirror 6, by a fan (not shown), airflow from the permeable port 6E on one side to the permeable port 6F on the other side is provided. To the non-reflecting parts 6D of the concave mirror 6, meshes 12 covering the permeable ports 6E, 6F are attached by thermosetting adhesive or heat resistant adhesive. It is preferable that the adhesive strength of the mesh 12 is set to such a level that the mesh 12 does not peel off by collision between the mesh 12 and broken pieces of the lamp (glass) made by a burst of the lamp 10. In the exemplary embodiment, impulse force of the lamp broken piece is about 4 kg per the lamp broken piece of 0.2 g, and the adhesive strength is set to such a level that the adhesive strength can resist this impulse force.

The mesh 12, as shown in FIGS. 4(*a*) and 4(*b*), is formed of an etching mesh made of metal, such as SUS, and having the high opening rate. The opening width of the mesh 12 is set to 0.3 mm or less, and its thickness is set to 30 to 50 μm. It is preferable that the opening rate α of the mesh 12 is set to a value satisfying 70%≦α≦90%. Good cooling effect and ventilation efficiency in the concave mirror 6 can thereby be surely obtained. In this case, when the opening rate α of the mesh 12 is 70% or more, the desired cooling effect and ventilation efficiency can be obtained. On the other hand, when the opening rate α of the mesh 12 is 90% or less, mechanical strength of the mesh does not significantly decrease.

In case that the mesh 12 of the high opening rate is used, the good cooling effect and ventilation efficiency in the concave mirror 6 can be surely obtained. Therefore, heat density of the lamp can be reduced, so that sufficiently high luminance and size reduction for related art lamps can be met and a long lamp lifetime of the lamp can be realized.

Further, as the mesh, a cross mesh made of metal, such as SUS, tungsten alloy, or steel; or a cross mesh made of plastics of thermosetting resin may be used.

On an inner surface of the permeable port 6E, 6F, as shown in FIG. 3, slits $6d_1$ and $6d_2$ to attach a protective wall 14 are provided. End edges of the protective wall 14 are attached to the slits $6d_1$ and $6d_2$ with the thermosetting adhesive or the high heat-resistant adhesive. This protective wall 14 is entirely formed of a high heat-resistant member composed of a thin piece made of SUS or synthetic resin, etc., that is parallel to a back surface of the light permeable member 8. The height of the protective wall 14 is set to such a dimension that the light emitted from the lamp is not intercepted. Further, the protective 14 does not have to be attached into the permeable port 6E, 6F with the adhesive, and can instead be attached by a mechanical method, such as forcing.

The protective wall 14 is arranged in a position where direct collision between the mesh 12 and broken pieces of the lamp resulting from the lamp 10 bursting is prevented. Namely, the protective wall 14 is arranged, in the permeable port 6E, 6F, in a portion P1 where the mesh 12 and an extension line $a_1$ of an imaginary line a connecting a center part 0 of the lamp 10 (center part of a luminous part formed into the luminous tube 10A) and an opening edge Q1 near the lamp of the permeable port 6E, 6F intersect. Therefore, even if the luminous tube 10A bursts due to increase of vapor pressure during lighting of the lamp 10, and the broken pieces of the lamp scatter toward the mesh 12, these broken pieces of the lamp are received by a back surface of the protective wall 14, so that direct collision of the broken pieces of the lamp with the mesh 12 is prevented.

Further, also in case that the protective wall 14 is arranged on the opening edge Q1 side near the lamp of the permeable port 6E, 6F from the portion P1 where the extension line $a_1$ and the mesh 12 intersect, direct collision of the broken pieces of the lamp with the mesh 12 can be prevented.

Further, the protective wall 14 is arranged in a position to prevent direct collision between the mesh 12 and broken pieces of the lamp that have bounced by the collision with the light permeable member 8 caused by the bursting of the lamp 10. Namely, the protective wall 14 is arranged, in the permeable port 6E, 6F, in a portion P2 where the mesh and a third imaginary line c that is line-symmetrical about a second imaginary line b connecting the center part O of the lamp 10 and a position Q2, on the back surface of the light permeable member 8, which is distant from a mesh surface by a half length of a total length of the protective wall 14 intersect. Here, "line" of line-symmetry means "an imaginary line on the same plane as the second imaginary line b and the third imaginary line c, which is a normal line passing the intersection point Q2, on the back surface of the light permeable member 8, of the second imaginary line b and the third imaginary line c". Therefore, if the lamp broken pieces that have scattered collide with the light permeable member 8 and bounced, these lamp broken pieces are received by a front surface of the protective wall 14, so that direct collision of the lamp broken pieces with the mesh 12 is prevented.

Further, also if the protective wall 14 is arranged on the light permeable member 8 side of the portion P2 where the third imaginary line c and the mesh 12 intersect, direct collision between the mesh 12 and the broken pieces of the lamp that have bounced by the collision with the light permeable member 8 can be prevented.

As described above, in the exemplary embodiment, direct collision of the lamp broken pieces with the mesh 12 can be prevented by the protective wall 14. Therefore, a mesh having a comparatively high opening rate can be used, and a good cooling effect and ventilation efficiency in the concave mirror 6 can be obtained.

Heat density of the lamp 10 can be reduced, so that high luminance and size reduction which recent lamps require can be met and a long lamp 10 lifetime can be realized.

Further, since the good cooling effect and ventilation efficiency can be obtained, the blowing amount to the lamp 10 by the cooling fin can be reduced. Therefore, the number of revolutions of the cooling fan can be reduced, so that the noise made by the cooling fan can be reduced.

A-2. Exemplary Embodiment 2

Figure 5:
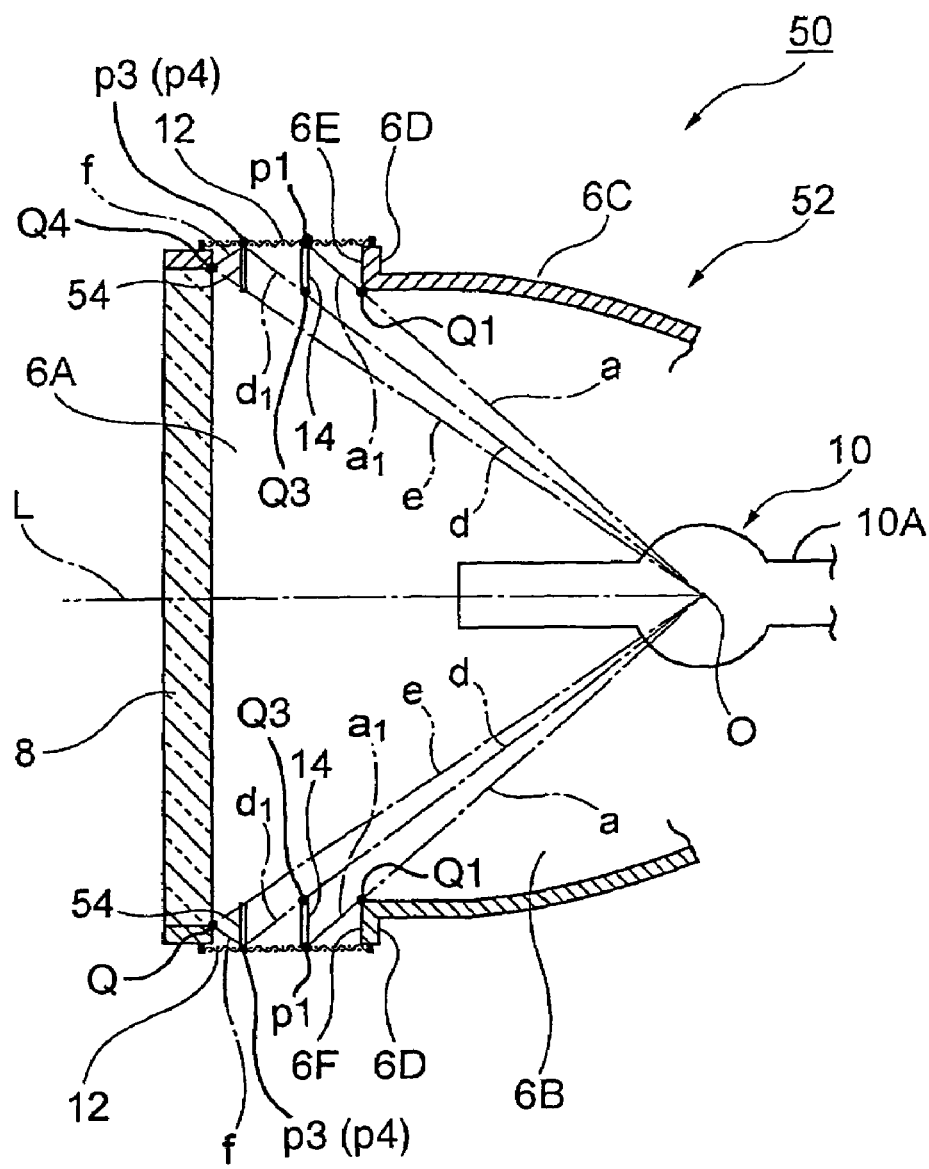
FIG. 5 is a sectional view showing a significant portion of a light source according to a second exemplary embodiment.

FIG. 5 is a sectional view showing a significant portion of a light source according to a second exemplary embodiment of the invention.

Figure 6:
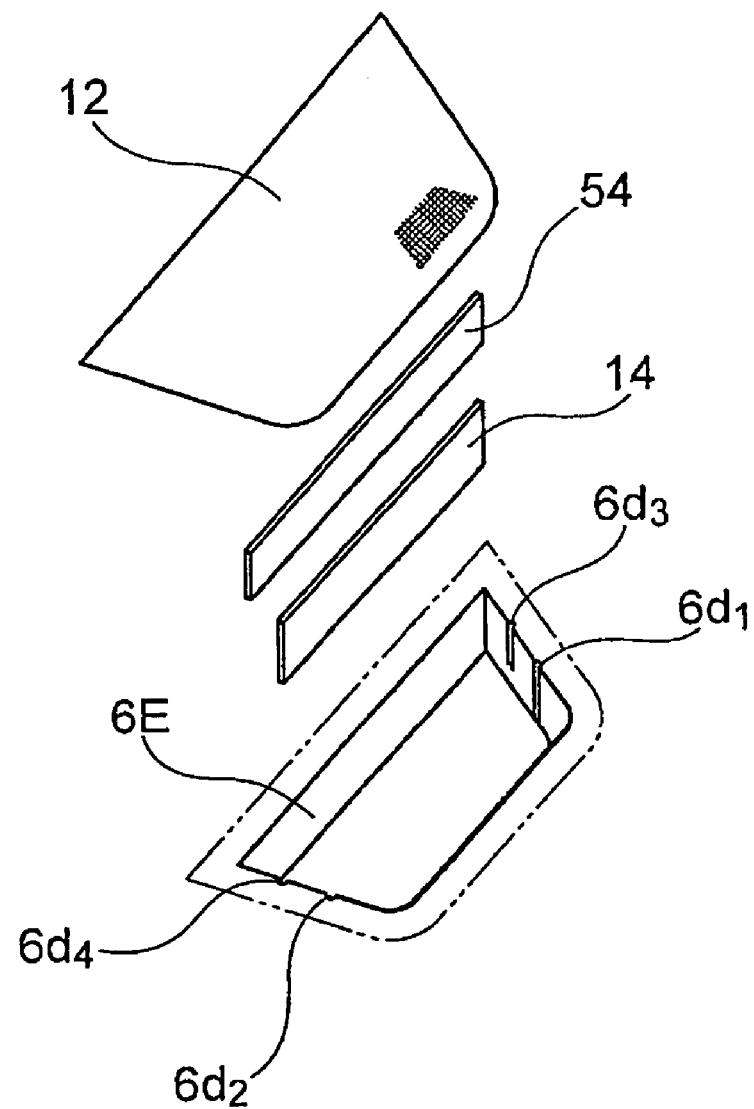
FIG. 6 is an exploded perspective view showing an attachment state of a protective wall and an auxiliary protective wall according to the second exemplary embodiment.

FIG. 6 is an exploded perspective view showing an attachment state of a protective wall and an auxiliary protective wall in the light source according to the second exemplary embodiment of the invention. In FIGS. 5 and 6, the same members as those in FIGS. 2 and 3 are denoted by the same reference numerals, and their detailed descriptions are omitted.

In the first exemplary embodiment, the protective wall 14 is provided in the position where it is possible to prevent, both lamp broken pieces that have scattered toward the mesh 12 and lamp broken pieces that have collided with the light permeable member 8 and bounced, from directly colliding with the mesh 12. On the contrary, the light source shown in this exemplary embodiment is provided such that: a protective wall 14 is provided in a position where it is possible to prevent lamp broken pieces that have scattered toward a mesh 12 from directly colliding with the mesh 12; and further, an auxiliary protective wall to protect the mesh is arranged in a position where the direct collision between the mesh and the lamp broken pieces scattering due to the bursting of the lamp and the lamp broken pieces that have collided with a light permeable member and bounced is prevented. Other features are similar to that in the first exemplary embodiment.

As shown in FIG. 5, a light source 50 in this exemplary embodiment includes a concave mirror 52, a light permeable member 8 and a lamp 10.

On an inner surface of a permeable port 6E, 6F of the concave mirror 52, as shown in FIG. 6, slits $6d_1$, $6d_2$ to attach the protective wall 14 and slits $6d_3$, $6d_4$ to attach the auxiliary protective wall 54 are provided.

The height dimensions of the protective wall 14 and the auxiliary protective wall 54 are set to such a dimension that the light emitted from the lamp is not intercepted.

End edges of the protective wall 14 are attached into the slits $6d_1$ and $6d_2$ with a thermosetting adhesive or a high heat-resistant adhesive. This protective wall 14 is entirely formed of a high heat-resistant member composed of a thin piece made of SUS or synthetic resin, etc., that is parallel to a back surface of the light permeable member 8. Further, the protective wall 14 is arranged in a position where direct collision between the mesh 12 and broken pieces of the lamp made by a bursting of the lamp 10 is prevented. Namely, the protective wall 14 is arranged, in the permeable port 6E, 6F, in a portion P1 where the mesh 12 and an extension line $a_1$ of an imaginary line a connecting a center part O of the lamp 10 and an opening edge Q1 near the lamp of the permeable port 6E, 6F intersect. Therefore, even if a luminous tube 10A bursts due to increase of vapor pressure during lighting of the lamp 10, and broken pieces of the lamp scatter toward the mesh 12, these broken pieces of the lamp are received by the protective wall 14, so that direct collision of the broken pieces of the lamp with the mesh 12 is prevented.

End edges of the auxiliary protective wall 54 are attached to the slits $6d_3$ and $6d_4$ with the thermosetting adhesive or the high heat-resistant adhesive. This auxiliary protective wall 54 is entirely formed of a high heat-resistant member composed of a thin piece made of SUS or synthetic resin that is parallel to the back surface of the light permeable member 8. Further, the auxiliary protective wall 54 is arranged in a position where direct collision between the mesh 12 and the broken pieces of the lamp made by the burst of the lamp 10 is prevented. Namely, the auxiliary protective wall 54 is arranged, in the permeable port 6E, 6F, in a portion P3 where the mesh 12 and an extension line $d_1$ of a fourth imaginary line d connecting the center part O of the lamp 10 and a leading end Q3 of the protective wall 14 intersect. Therefore, even if the luminous tube 10A bursts due to increase of vapor pressure during lighting of the lamp 10, and the broken pieces of the lamp scatter toward the mesh 12, these broken pieces of the lamp are received by a back surface of the auxiliary protective wall 54, so that direct collision of the broken pieces of the lamp with the mesh 12 is prevented.

Further, also in case that the auxiliary protective wall 54 is arranged on the protective wall 14 side of the permeable port 6E, 6F from the portion P3 where the second extension line $d_1$ and the mesh 12 intersect, direct collision of the broken pieces of the lamp with the mesh 12 can be prevented.

Further, the auxiliary protective wall 54 is arranged in a position where direct collision between the mesh 12 and the lamp broken pieces that have collided with the light permeable member 8 due to the bursting of the lamp and bounded can also be prevented. Namely, the auxiliary protective wall 54 is, in the permeable ports 6E, 6F, in a portion P4 where the mesh 12 and a seventh imaginary line f that is line-symmetrical about a sixth imaginary line e connecting the center part O of the lamp 10 and a position Q4, on the back surface of the light permeable member 8, which is distant from the mesh surface by a half length of a total length of the auxiliary protective wall 54 that is closest to the light permeable member 8 intersect. Here, "line" of line-symmetry means "an imaginary line on the same plane as the sixth imaginary line e and the seventh imaginary line f, which is a normal line passing the intersection point Q4, on the back surface of the light permeable member 8, of the sixth imaginary line e and the seventh imaginary line f". Accordingly, also if the lamp broken pieces that have scattered collide with the light permeable member 8 and bound, these broken pieces of the lamp are received by a front surface of the auxiliary protective wall 54, so that collision of the broken pieces of the lamp with the mesh 12 is prevented.

Further, also if the auxiliary protective wall 54 is arranged on the light permeable member 8 side of the portion P4 where the seventh imaginary line f and the mesh 12 intersect, direct collision between the mesh 12 and the lamp broken pieces that have collided with the light permeable member 8 and bounded can be prevented.

As described above, in the exemplary embodiment, by the protective wall 14 and the auxiliary protective wall 54, direct collision of the lamp broken pieces with the mesh 12 can be prevented, so that a similar effect to that in the first exemplary embodiment can be obtained.

A-3. Exemplary Embodiment 3

Figure 7:
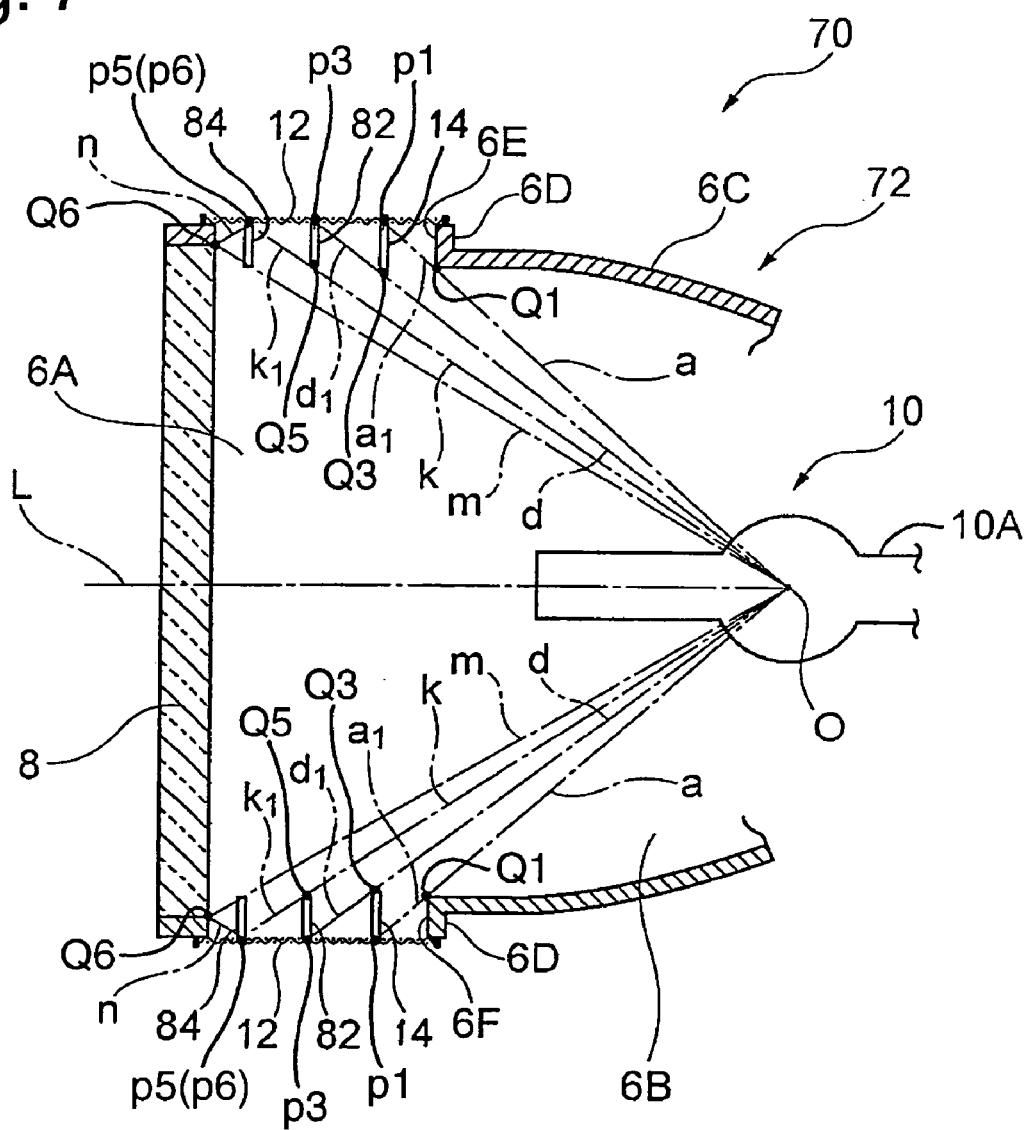
FIG. 7 is a sectional view showing a significant portion of a light source according to a third exemplary embodiment.

In the second exemplary embodiment (FIGS. 5 and 6), only one auxiliary protective wall is provided. However, as shown in FIG. 7, plural auxiliary protective walls 82, 84 may be provided on a light permeable member 8 side of a protective wall 14 in parallel. This exemplary embodiment is different from the second exemplary embodiment in that the plural auxiliary protective walls 82, 84 are provided. Other features are similar to that in the second exemplary embodiment. FIG. 7 is a sectional view showing a significant portion of a light source according to a third exemplary embodiment. In FIG. 7, the same members as those in FIG. 5 are denoted by the same reference numerals, and their detailed descriptions are omitted.

As shown in FIG. 7, a light source 70 in this exemplary embodiment includes a concave mirror 72, a light permeable member 8 and a lamp 10.

The auxiliary protective walls 82 and 84 are arranged in positions where direct collision of lamp broken pieces made by a bursting of the lamp 10 with a mesh 12 is prevented. Namely, the auxiliary protective wall 82 on the protective wall 14 side is arranged, in permeable port 6E, 6F, in a portion P3 where the mesh 12 and an extension line $d_1$ of a fourth imaginary line d connecting a center part O of the lamp 10 and a leading end Q3 of the protective wall 14 intersect. Further, the auxiliary protective wall 84 on the light permeable member 8 side is arranged in a portion P5 where the mesh 12 and a fifth extension line $k_1$ of a twelfth imaginary line k connecting the center part O of the lamp 10 and a leading end Q5 of the auxiliary protective wall 82 intersect. Therefore, even if a luminous tube 10A bursts due to increase of vapor pressure during lighting of the lamp 10, and the broken pieces of the lamp scatter toward the mesh 12, these broken pieces of the lamp are received by back surfaces of the auxiliary protective walls 82 and 84, so that direct collision of the broken pieces of the lamp with the mesh 12 is prevented.

Further, the auxiliary protective wall 84 on the light permeable member 8 side is arranged in a position where direct collision between the mesh 12 and the broken pieces of the lamp that have bounced by the collision with the light permeable member 8 due to the bursting of the lamp 10 can be also prevented. Namely, the auxiliary protective wall 84 is arranged in a portion P6 where the mesh 12 and a fourteenth imaginary line n that is line-symmetrical about a thirteenth imaginary line m connecting the center part O of the lamp 10 and a position Q6, on the back surface of the light permeable member 8, which is distant from the mesh 12 surface by a half length of a total length of the auxiliary protective wall 84 intersect. Here, "line" of line-symmetry means "an imaginary line on the same plane as the thirteenth imaginary line m and the fourteenth imaginary line n, which is a normal line passing the intersection point Q6, on the back surface of the light permeable member 8, of the thirteenth imaginary line m and the fourteenth imaginary line n". Therefore, even if the broken pieces of the lamp that have scattered collide with the light permeable member 8 and bounce, these broken pieces of the lamp are received by a front surface of the auxiliary protective wall 84, so that collision of the broken pieces of the lamp with the mesh 12 is prevented.

As described above, if the plural auxiliary protective walls 82 and 84 are also provided, direct collision of the broken pieces of the lamp with the mesh 12 can be prevented, so that a similar effect to that in the first exemplary embodiment can be obtained.

A-4. Exemplary Embodiment 4

The first to third exemplary embodiments include a structure in which the protective wall 14, and the auxiliary protective wall 54, 82, 84 are formed separately from the concave mirrors 6, 52, 72. However, they may be integrally formed.

FIG. 8 is a schematic showing, as one example, a state where the protective wall 14 and the auxiliary protective walls 54 in the second exemplary embodiment are formed integrally with the concave mirror 72. In this case, manufacture of the protective wall 14 and the auxiliary protective wall 54 is performed simultaneously with manufacture of the concave mirror 72. Compared with the case in which the protective wall and the like are manufactured separately from the concave mirror 72, a manufacturing cost can be reduced.

In the first exemplary embodiment and the third exemplary embodiment, if the protective wall 14 and the auxiliary protective walls 82, 84 are also formed integrally with the concave mirror 6 or 72, a similar effect can be obtained.

A-5. Exemplary Embodiment 5

In the first to third exemplary embodiments, the protective wall 14 and the auxiliary protective walls 54, 82, 84 are attached in the grooves $6d_1$ to $6d_4$ of the concave mirrors 6, 52, 72. However, they may be provided for the concave mirror via an attachment spacer.

Figure 9:
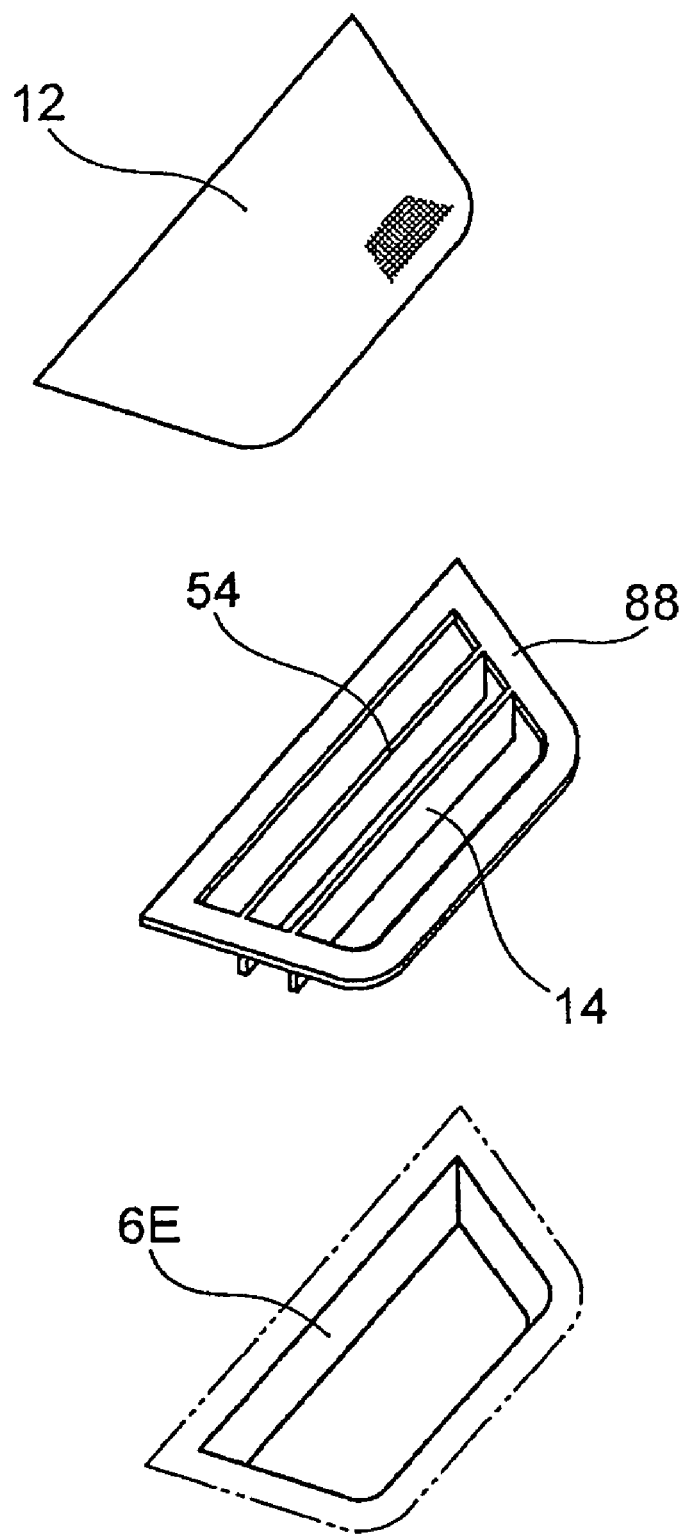
FIG. 9 is an exploded perspective view showing a fifth exemplary embodiment.

FIG. 9 is a schematic showing, as one example, a state where the protective wall 14 and the auxiliary protective wall 54 in the second exemplary embodiment are arranged in the permeable port 6E in the concave mirror via an attachment spacer 88. It is not necessary to form the attachment part such as the groove $6d_1$ to $6d_4$ in the concave mirror in order to attach the protective wall 14 and the auxiliary protective wall 54 to the concave mirror (inner surface of the permeable port 6E), so that the manufacturing cost can be reduced.

In the first exemplary embodiment and the third exemplary embodiment, if the protective wall 14 and the auxiliary protective walls 82, 84 are also attached to the concave mirror 6 or 72 via the attachment spacer, a similar effect can be obtained.

A-6. Exemplary Embodiment 6

In the first to fifth exemplary embodiments, the protective wall 14 is parallel to the light permeable member 8. However, by inclining this protective wall in relation to the back surface of the light permeable member 8, it is possible to provide a function as a rectifying wall of air flowing into the concave mirror 6 to the protective wall 14.

Figure 10:
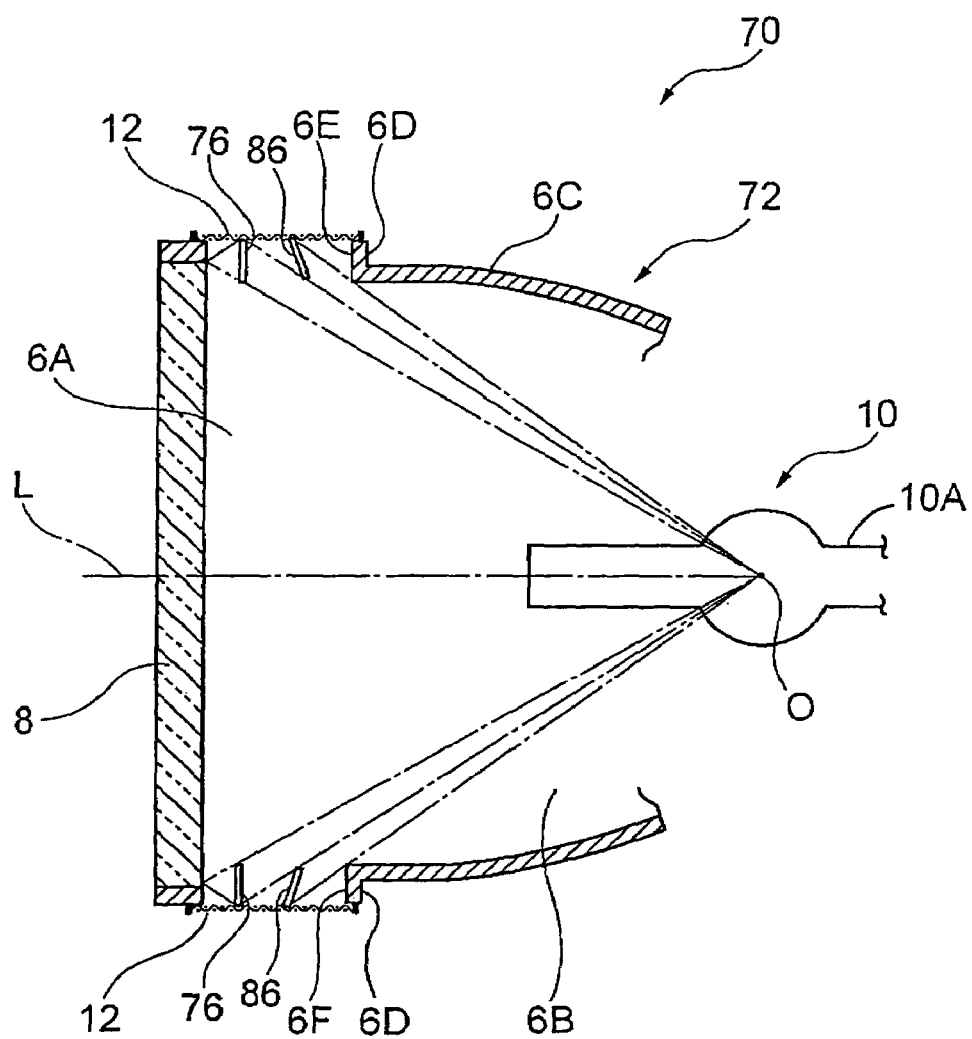
FIG. 10 is an exploded perspective view showing a sixth exemplary embodiment.

FIG. 10 is a schematic showing, as one example, a state where the protective wall 86 in the constitution of the second exemplary embodiment is inclined, as the rectifying wall, in relation to the back surface of the light permeable member 8. In this case, airflow is guided into the concave mirror 72 along the protective wall 86. Cool wind flowing from the outside of the concave mirror 72 through the permeable ports 6D, 6E into the concave mirror 72 can be rectified.

In other exemplary embodiments, if the protective wall 14 is also inclined in relation to the back surface of the light permeable member 8, a similar effect can be obtained.

B. EXEMPLARY EMBODIMENT OF PROJECTOR

Figure 11:
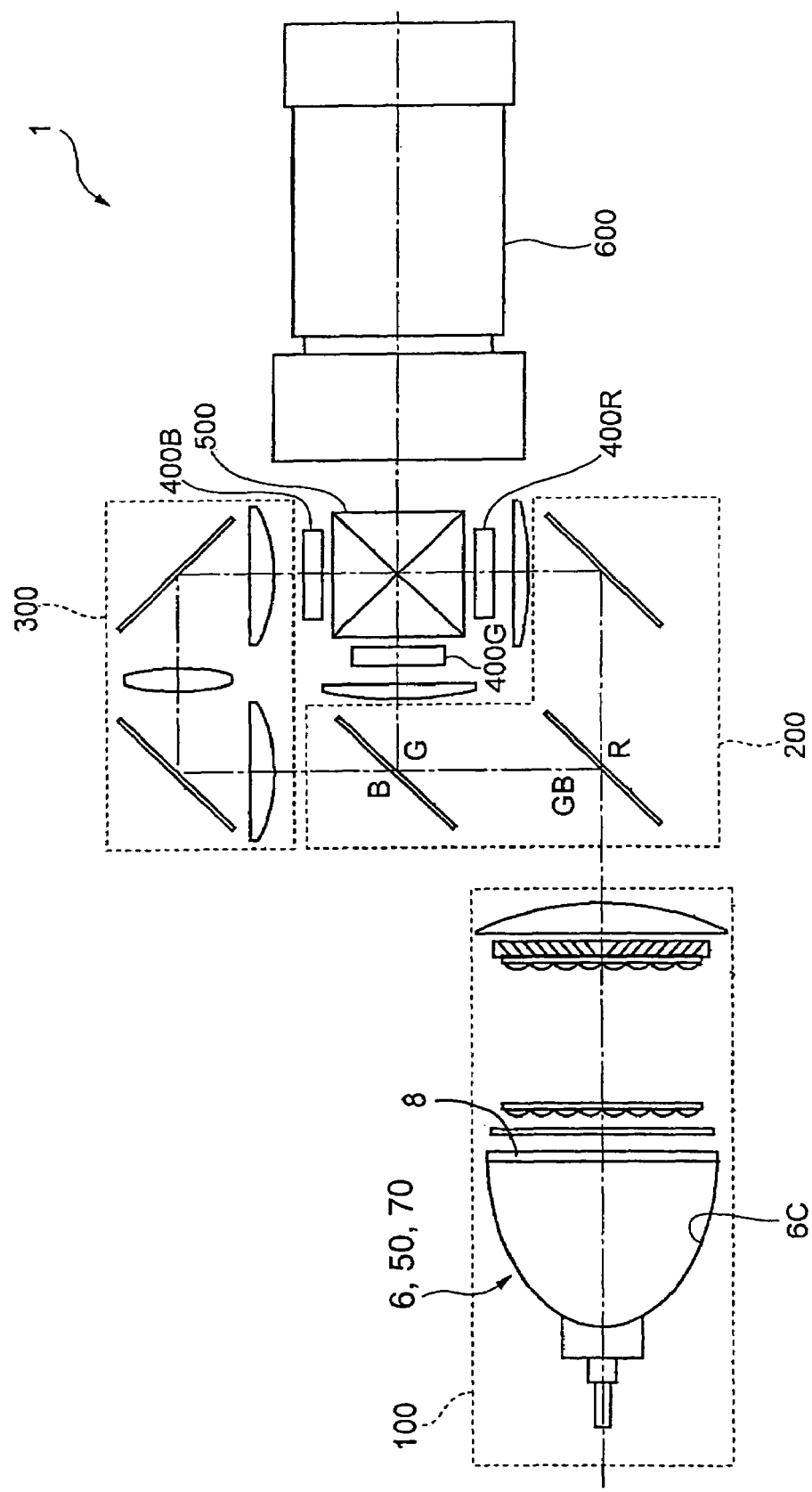
FIG. 11 is a plan view showing one exemplary embodiment of a projector of the invention.

FIG. 11 is a plan view showing an example in which the light sources 6, 50, 70 according to the first to sixth exemplary embodiments described above are applied to a projector. In FIG. 11, a projector 1 includes an illuminating optical system 100, a color separation optical system 200, a relay optical system 300, three electro-optic modulating elements 400R, 400G, 400B, a cross dichroic prism 500, and a projecting lens 600. The components of each optical system are arranged nearly in the horizontal direction, centering around the cross dichroic prism 500.

Under the above constitution, the light emitted from the illuminating optical system 100 is separated into light of each color of red R, green G, and blue B, and these color lights are respectively guided to light bulbs 400R, 400G, 400B to be modulated according to image signals. Thereafter, each color light is compounded by the cross dichroic prim 500, enlarged by the projecting lens 600, and displayed on a screen. The constitution and functions of optical systems other than the light sources 6, 50, 70 are disclosed in JP-A-10-177151.

The illuminating optical system 100 includes the light sources 6, 50, 70 in the first to sixth exemplary embodiments. Therefore, according to the projector 1 in this exemplary embodiment, sufficiently high luminance and size reduction for related art lamps can be met, and an increased lamp lifetime can be realized.

Further, according to the projector 1 in the exemplary embodiment, flow path resistance of ventilation to the lamp can be reduced. Therefore, the number of revolutions of the cooling fan can be reduced, and the noise can be reduced, increasing the cooling performance.

In the exemplary embodiment, a case in which the light source of the invention is applied to the three-plate type projector using the three electro-optic modulating elements is described. However, the invention can be applied also to a projector having one, two, or four or more electro-optic modulating elements.

Further, as the electro-optic modulating element, various elements, such as a liquid crystal panel and a modulation element in which a pixel is composed by plural mirrors, can be used.

Further, the projector can be a front type projector in which a projected image is observed from the same direction as a direction in which an image is projected, and a rear type projector in which a projected image is observed from the opposite direction to a direction in which an image is projected. The light source of the invention can be applied to any type of projector.

The invention claimed is:

1. A light source, comprising:
    a lamp which emits light;
    a concave mirror which reflects the light emitted from the lamp and has an opening part which issues the light;
    a light permeable member which covers the opening part of the concave mirror; and
    a lamp housing into which attached the concave mirror, the lamp housing having a through-window,
    the concave mirror including a permeable port, which is corresponding to the through-window, a mesh covering the permeable port, and a protective wall to protect the mesh, which is arranged in a position to prevent direct collision between the mesh and broken pieces of the lamp resulting from the lamp bursting, the protective wall being arranged in a position to prevent direct collision between the mesh and the broken pieces of the lamp that have bounced by the collision with the light permeable member, and the protective wall being arranged apart from the light permeable member.

2. The light source according to claim 1, the protective wall being arranged, in the permeable port, in a portion where the mesh and an extension line of an imaginary line connecting a center part of the lamp and an opening edge near the lamp of the permeable port intersect, or on the opening edge side near the lamp of the portion.

3. The light source according to claim 1,
    the protective wall being arranged, in the permeable port, in a portion where the mesh and a third imaginary line that is line-symmetrical about a second imaginary line connecting the center part of the lamp and a position, on a back surface of the light permeable member, which is distant from the mesh surface by a half length of a total length of the protective wall intersect; or on the light permeable member side of the portion.

4. The light source according to claim 1, the height of the protective wall being set to a dimension by which an emergent ray from the lamp is not intercepted.

5. The light source according to claim 1, the protective wall inclining in relation to the back surface of the light permeable member.

6. The light source according to claim 1,
    the protective wall being integrally provided for the concave mirror.

7. The light source according to claim 1, the protective wall being attached to the concave mirror via an attachment spacer.

8. The light source according to claim 1,
    the concave mirror further having an auxiliary protective wall to protect the mesh.

9. The light source according to claim 8, the auxiliary protective wall being arranged in a position to prevent direct collision between the mesh and broken pieces of the lamp resulting from the lamp bursting.

10. The light source according to claim 8, the auxiliary protective wall being arranged, in the permeable port, in a portion where the mesh and an extension line of a fourth imaginary line connecting the center part of the lamp and a leading end of the protective wall intersect, or on the protective wall side of the portion.

11. The light source according to claim 8, the auxiliary protective wall including the plural auxiliary protective walls arranged on the light permeable member side of the protective wall in parallel; and
    the auxiliary protective wall on the light permeable member side being arranged in a portion where the mesh and an extension line of a fifth imaginary line connecting the center part of the lamp and a leading end of the auxiliary protective wall on the protective wall side intersect, or on the protective wall side of the portion.

12. The light source according to claim 8, the auxiliary protective wall being arranged in a position to prevent direct collision between the mesh and the broken pieces of the lamp that have bounced by the collision with the light permeable member.

13. The light source according to claim 12, the auxiliary protective wall being arranged, in the permeable port, in a portion where the mesh and a seventh imaginary line that is line-symmetrical about a sixth imaginary line connecting the center part of the lamp and a position, on the back surface of the light permeable member, which is distant from the mesh surface by a half length of a total length of the auxiliary protective wall that is closest to the light permeable member intersect; or on the light permeable member side of the portion.

14. The light source according to claim 8, the height of the auxiliary protective wall being set to a dimension by which an emergent ray from the lamp is not intercepted.

15. The light source according to claim 8, the auxiliary protective wall being provided integrally for the concave mirror.

16. The light source according to claim 8, the auxiliary protective wall being provided for the concave mirror via an attachment spacer.

17. A projector, comprising:
    the light source according to claim 1;
    an electro-optic modulator which modulates the emergent ray from the light source according to image signals; and
    a projecting optical system which projects and displays the modulated light from the electro-optic modulator.

18. The projector according to claim 1, the protective wall being arranged, in the permeable port, in a portion where the mesh and an extension line of an imaginary line connecting a center part of the lamp and an opening edge near the lamp of the permeable port intersect, or on the opening edge side near the lamp of the portion.

19. The projector according to claim 1, the protective wall being arranged in a position to prevent direct collision between the mesh and the broken pieces of the lamp that have bounced by the collision with the light permeable member.

20. The projector according to claim 1,
    the protective wall being arranged, in the permeable port, in a portion where the mesh and a third imaginary line that is line-symmetrical about a second imaginary line connecting the center part of the lamp and a position, on a back surface of the light permeable member, which is distant from the mesh surface by a half length of a total length of the protective wall intersect; or on the light permeable member side of the portion.

21. The projector according to claim 1, the height of the protective wall being set to a dimension by which an emergent ray from the lamp is not intercepted.

22. The projector according to claim 1, the protective wall inclining in relation to the back surface of the light permeable member.

23. The projector according to claim 1,
the protective wall being integrally provided for the concave mirror.

24. The projector according to claim 1, the protective wall being attached to the concave mirror via an attachment spacer.

25. The projector according to claim 1,
the concave mirror further having an auxiliary protective wall to protect the mesh.

26. The projector according to claim 25, the auxiliary protective wall being arranged in a position to prevent direct collision between the mesh and broken pieces of the lamp scattering due to the bursting of the lamp.

27. The projector according to claim 25, the auxiliary protective wall being arranged, in the permeable port, in a portion where the mesh and an extension line of a fourth imaginary line connecting the center part of the lamp and a leading end of the protective wall intersect, or on the protective wall side of the portion.

28. The projector according to claim 25, the auxiliary protective wall including the plural auxiliary protective walls arranged on the light permeable member side of the protective wall in parallel; and
the auxiliary protective wall on the light permeable member side being arranged in a portion where the mesh and an extension line of a fifth imaginary line connecting the center part of the lamp and a leading end of the auxiliary protective wall on the protective wall side intersect, or on the protective wall side of the portion.

29. The projector according to claim 25, the auxiliary protective wall being arranged in a position to prevent direct collision between the mesh and the broken pieces of the lamp that have bounced by the collision with the light permeable member.

30. The projector according to claim 29, the auxiliary protective wall being arranged, in the permeable port, in a portion where the mesh and a seventh imaginary line that is line-symmetrical about a sixth imaginary line connecting the center part of the lamp and a position, on the back surface of the light permeable member, which is distant from the mesh surface by a half length of a total length of the auxiliary protective wall that is closest to the light permeable member intersect; or on the light permeable member side of the portion.

31. The projector according to claim 25, the height of the auxiliary protective wall being set to a dimension by which an emergent ray from the lamp is not intercepted.

32. The projector according to claim 25, the auxiliary protective wall being provided integrally for the concave mirror.

33. The projector according to claim 25, the auxiliary protective wall being provided for the concave mirror via an attachment spacer.

* * * * *